(12) United States Patent
Fan et al.

(10) Patent No.: US 11,238,050 B2
(45) Date of Patent: Feb. 1, 2022

(54) METHOD AND APPARATUS FOR DETERMINING RESPONSE FOR USER INPUT DATA, AND MEDIUM

(71) Applicant: BAIDU ONLINE NETWORK TECHNOLOGY (BEIJING) CO., LTD., Beijing (CN)

(72) Inventors: Miao Fan, Beijing (CN); Chao Feng, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 202 days.

(21) Appl. No.: 16/459,282

(22) Filed: Jul. 1, 2019

(65) Prior Publication Data

US 2020/0012650 A1      Jan. 9, 2020

(30) Foreign Application Priority Data

Jul. 3, 2018    (CN) .......................... 201810717731.6

(51) Int. Cl.
    *G06F 16/00*       (2019.01)
    *G06F 16/2457*     (2019.01)
    *G06F 16/248*      (2019.01)

(52) U.S. Cl.
    CPC ...... *G06F 16/24573* (2019.01); *G06F 16/248* (2019.01); *G06F 16/24578* (2019.01)

(58) Field of Classification Search
    None
    See application file for complete search history.

(56) References Cited

U.S. PATENT DOCUMENTS

| 6,615,209 B1 * | 9/2003 | Gomes ................. G06F 16/338 |
| 8,176,031 B1 * | 5/2012 | Rubin ................. G06F 16/2255 |
| | | 707/706 |

(Continued)

FOREIGN PATENT DOCUMENTS

| CN | 104899322 A | 9/2015 |
| CN | 107330120 A | 11/2017 |
| CN | 107609092 A | 1/2018 |

OTHER PUBLICATIONS

Chinese Patent Application No. 201810717731.6, Office Action dated Nov. 24, 2021, 7 pages.

(Continued)

*Primary Examiner* — Bai D Vu
(74) *Attorney, Agent, or Firm* — Lathrop GPM LLP (57) ABSTRACT

According to exemplary embodiments of the present disclosure, a method and an apparatus for determining a response for user input data, a device, and a computer-readable storage medium are provided. The method includes: obtaining search results associated with the user input data. The method also includes: determining correlation degrees between the search results and the user input data. The method also includes: building candidate content for the user input data based on the search results and the correlation degrees. The candidate content includes a paragraph associated with the user input data in the search results. The method also includes: determining the response for the user input data from the candidate content.

14 Claims, 5 Drawing Sheets

(56) References Cited

U.S. PATENT DOCUMENTS

| | | | |
|---|---|---|---|
| 2003/0055810 A1* | 3/2003 | Cragun | G06F 16/3347 |
| 2005/0222989 A1* | 10/2005 | Haveliwala | G06Q 30/02 |
| 2014/0149403 A1* | 5/2014 | Miller | G06F 3/0482 |
| | | | 707/728 |
| 2014/0358890 A1* | 12/2014 | Chen | G06F 16/3329 |
| | | | 707/710 |
| 2016/0246476 A1* | 8/2016 | Harris | H04W 4/21 |

OTHER PUBLICATIONS

Chinese Patent Application No. 201810717731.6, Office Action dated Nov. 24, 2021, 8 pages.

\* cited by examiner

METHOD AND APPARATUS FOR DETERMINING RESPONSE FOR USER INPUT DATA, AND MEDIUM

CROSS-REFERENCE TO RELATED APPLICATION

The present application is based upon and claims priority to Chinese Patent Application No. 201810717731.6, filed on Jul. 3, 2018, the entire contents of which are incorporated herein by reference.

FIELD

Embodiments of the present disclosure generally relate to a field of search technologies, and more particularly to a method and an apparatus for determining a response for user input data, and a computer-readable storage medium.

BACKGROUND

With the rapid development of the computer technology, applications of computers in various aspects are gradually enhanced. In order to enable a machine to react in a way similar to human, artificial intelligence also obtains a fast development, and various artificial intelligent devices appears in various fields and industries. With the enhancement of algorithms and data processing capacity, there are also more and more scenes for applying artificial intelligence. With the development of the technology, artificial intelligence has shown great developing potential in various aspects. For example, in some product industries, some artificial intelligent robots have begun to serve people.

In real life, obtaining an answer by asking a question is a common way for obtaining information. With the rapid improvement of the data processing capacity, artificial intelligence begins to be used to solve such problem. In daily life, some intelligent question answering products which may simply communicate with a user have been developed, such as Microsoft Xiaoice, Duer of Baidu, Watson of IBM, Siri of Apple and the like. These speech assistants bring great convenience and fun to our lives, and also excite more and more industries to pay attention to and invest to an intelligent question answering system. In addition, a plurality of intelligent question answering robots have been appeared. Although these products may implement certain dialogue function, they may not show an accurate answer for the asked question, causing limitations in a real scene application.

SUMMARY

According to exemplary embodiments of the present disclosure, a method and an apparatus for determining a response for user input data, and a computer-readable storage medium are provided.

Embodiments of the present disclosure provide a method for determining a response for user input data. The method includes: obtaining search results associated with the user input data. The method also includes: determining correlation degrees between the search results and the user input data. The method also includes: building candidate content for the user input data based on the search results and the correlation degrees. The candidate content includes a paragraph associated with the user input data in the search results. The method also includes: determining the response for the user input data from the candidate content.

Embodiments of the present disclosure provide an apparatus for determining a response for user input data. The apparatus includes: an obtaining module, a first determining module, a candidate content building module and a response determining module. The obtaining module is configured to obtain search results associated with the user input data. The first determining module is configured to determine correlation degrees between the search results and the user input data. The candidate content building module is configured to build candidate content for the user input data based on the search results and the correlation degrees. The candidate content includes a paragraph associated with the user input data in the search results. The response determining module is configured to determine the response for the user input data from the candidate content.

Embodiments of the present disclosure provide a computer-readable storage medium. A computer program is stored on the computer-readable storage medium. When the computer program is executed by a processor, a method for determining a response for user input data according to embodiments of the present disclosure is implemented.

It should be understood that, descriptions in Summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Embodiments of the present disclosure will be described in more detail below with reference to the accompanying drawings. Although certain embodiments of the present disclosure are illustrated in the accompanying drawings, it should be understood that the present disclosure may be implemented in various manners without being limited by the embodiments elaborated herein. On the contrary, embodiments are provided to make the present disclosure more thorough and complete. It should be understood that, the accompanying drawings and embodiments of the present disclosure are merely used for exemplary purposes, and are not used to limit the protection scope of the present disclosure.

In the description of embodiments of the present disclosure, the term "include" and its equivalents should be understood as an open "include" (a non-exclusive "include"), that is, "include but not limited to". The term "based on" should be understood as "based at least in part (at least partially based on)". The term "an embodiment" or "the embodiment" should be understood as "at least one embodiment". Other explicit and implicit definitions may also be included below.

As mentioned above, people hope to obtain an accurate answer of a question by applying artificial intelligence. In an existed method for obtaining the answer of the question by artificial intelligence, a template matching method and a semantic analysis method based on keyword extraction are commonly used to obtain the answer of the question.

However, when the answer of the question is obtained by the template matching method, types of various questions need to be determined in advance, and templates of respective questions also need to be provided in advance. The answer of the question is generated by combining some obtained information with the template. Such implementation method needs to give all possible answer templates for different types of questions, which needs a large amount of work.

When the answer of the question is obtained by the semantic analysis method based on keyword extraction, three processes including question analysis, paragraph search and answer extraction are needed to obtain the desired answer. However, when the semantic analysis method based on keyword extraction is applied, it also needs to obtain the large amount of templates like the template matching method, causing a large amount of preliminary works.

In addition, those existed technologies merely answer actual questions, but may not answer subjective questions. For example, a question such as "please elaborate the impact of World War II on Germany" may not be answered. Therefore, there are a plurality of problems in the existed technology in aspects of diversity of processed questions, a scale of the background knowledge reserve and satisfaction for answering the question.

Embodiments of the present disclosure provide a method for determining a response for user input data. The method, for example, may be applied to answer user's questions. With embodiments of the present disclosure, search results associated with the user input data are firstly obtained by employing a search based on the Internet. By using the search based on the Internet, a scale of a database and update efficiency may be increased greatly. Then candidate content is determined based on correlation degrees between the search results and the user input data. The candidate content includes a paragraph associated with the user input data in the search results. Candidate content for the user input data is built based on the search results and the correlation degrees. In this way, the number of webpages for the response may be decreased greatly, and a paragraph having a high correlation degree with the user input data may be obtained. Finally, the response is determined from the candidate content. In this way, it is implemented that a more accurate response is returned directly to the user, thus improving user's experience.

In embodiments of the present disclosure, the term "search result" refers to information related to the user input data, which is obtained from the database based on the user input data by using a search engine through the network. The search result may also be obtained in other ways. For example, the search result is retrieved directly from a file. The search result may be a webpage, or a text. The type of the above search result is merely exemplary, which is not a limitation of the search result.

The term "candidate content" refers to information for the response of the user input data, which is selected from some articles or information. The candidate content consists of some paragraphs associated with the user input data in the search results. For example, the candidate content may include one or more paragraphs. The term "correlation degree" refers to a degree of the user input data associating with data (such as a webpage, a paragraph) corresponding to the user input data. A high correlation degree represents the user input data strongly associated with the corresponding data. A low correlation degree represents the user input data slightly associated with the corresponding data. For example, a correlation degree between a keyword and a webpage may be determined according to the viewing times of the web page when the keyword is searched for.

Figure 1:
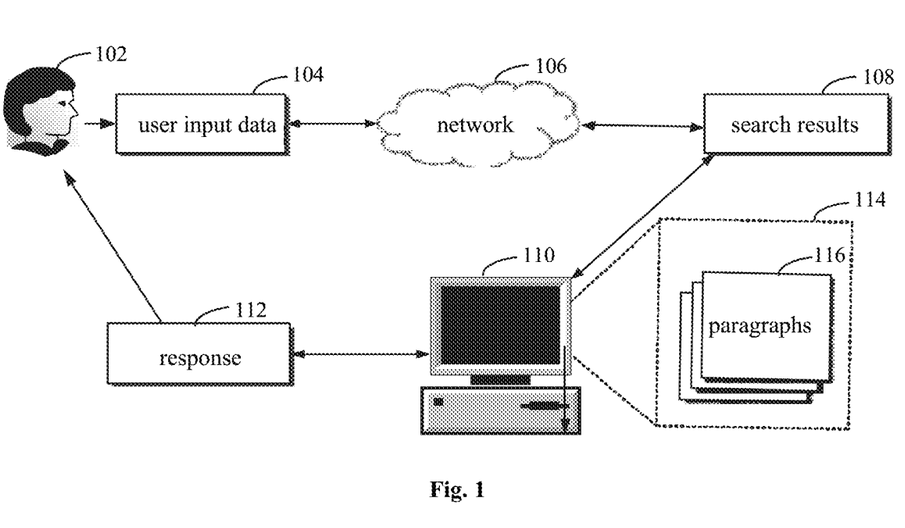
FIG. 1 is a schematic diagram 100 illustrating an exemplary environment where embodiments of the present disclosure may be implemented.

The present disclosure illustrates a schematic diagram 100 illustrating an exemplary environment in FIG. 1. The exemplary environment may include a user 102, the user 102 sends user input data 104 to the search engine, and search results 108 are obtained via a network 106. The user input data may be a question inputted by the user 102.

The network 106 may be various types of networks such as a wireless network and a wired network. The search results 108 include various search results associated with the user input data 104 obtained by the search engine.

A response determining apparatus 110 is configured to obtain the search results 108, and then to determine a correlation degree between a search result in the search results 108 and the user input data 104. Then, the response determining apparatus 110 builds candidate content 114 for the user input data 104 based on the search results 108 and the correlation degrees. The candidate content 114 includes a paragraph 116 associated with the user input data 104 in the search results 108. The response determining apparatus 110 generates a response 112 for the user input data 104 from the candidate content 114. The user 102 may employ any suitable input apparatus to input the user input data 104. In some embodiments, the input apparatus includes a text input apparatus, and may also include a speech input apparatus. The input apparatus may also include other suitable apparatuses for inputting the user input data. In some embodiments, when the user input data is inputted by the speech input apparatus, the inputted speech is converted into a text.

The response determining apparatus 110 may be implemented by any type of computing device, including but not limited to a mobile phone (such as, a smart phone), a laptop, a portable personal digital assistant (PDA), an e-book reader, a portable game machine, a portable media player, a game machine, a set-top box (STB), a smart television (TV), a personal computer, a laptop computer, an on-board computer (such as, a navigation unit), etc.

The above FIG. 1 illustrates the exemplary environment 100 for determining the response 112 of the user input data 104. A process for determining the response 112 of the user input data 104 is described in detail below with reference to FIG. 2.

Figure 2:
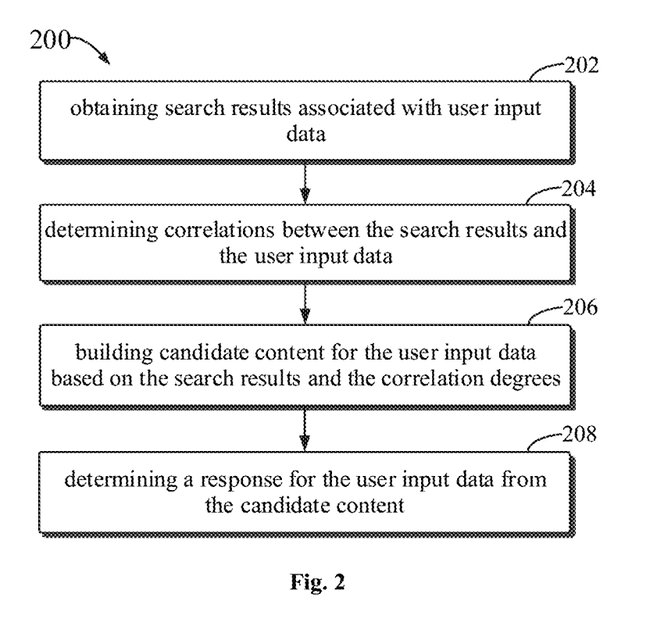
FIG. 2 is a flow chart 200 illustrating a method for determining a response for user input data according to an embodiment of the present disclosure.

Firstly, the user inputs the user input data through the input apparatus. In some embodiments, the user input data may be a question. Those embodiments are merely intended for explaining the user input data, and do not limit the user input data. For example, the user 102 inputs the user input data "How is Baidu's stock today". In some embodiments, the user may directly input the user input data in form of text through the input apparatus. In another embodiment, the user may input the user input data through a speech input device, such as a microphone, then the inputted speech is converted into a text. In another embodiment, the user may input the user input data in any form through any suitable input device.

After the user input data 104 is obtained, at block 202, the response determining apparatus 102 obtains the search results 108 associated with the user input data 104 from the user 102 through the search engine. The user input data 104 firstly retrieves the search results 108 associated with the user input data on the network 106 through the search engine. Alternatively or additionally, the search result is a webpage. The search engine may retrieve various webpages associated with the user input data through the network.

Figure 3:
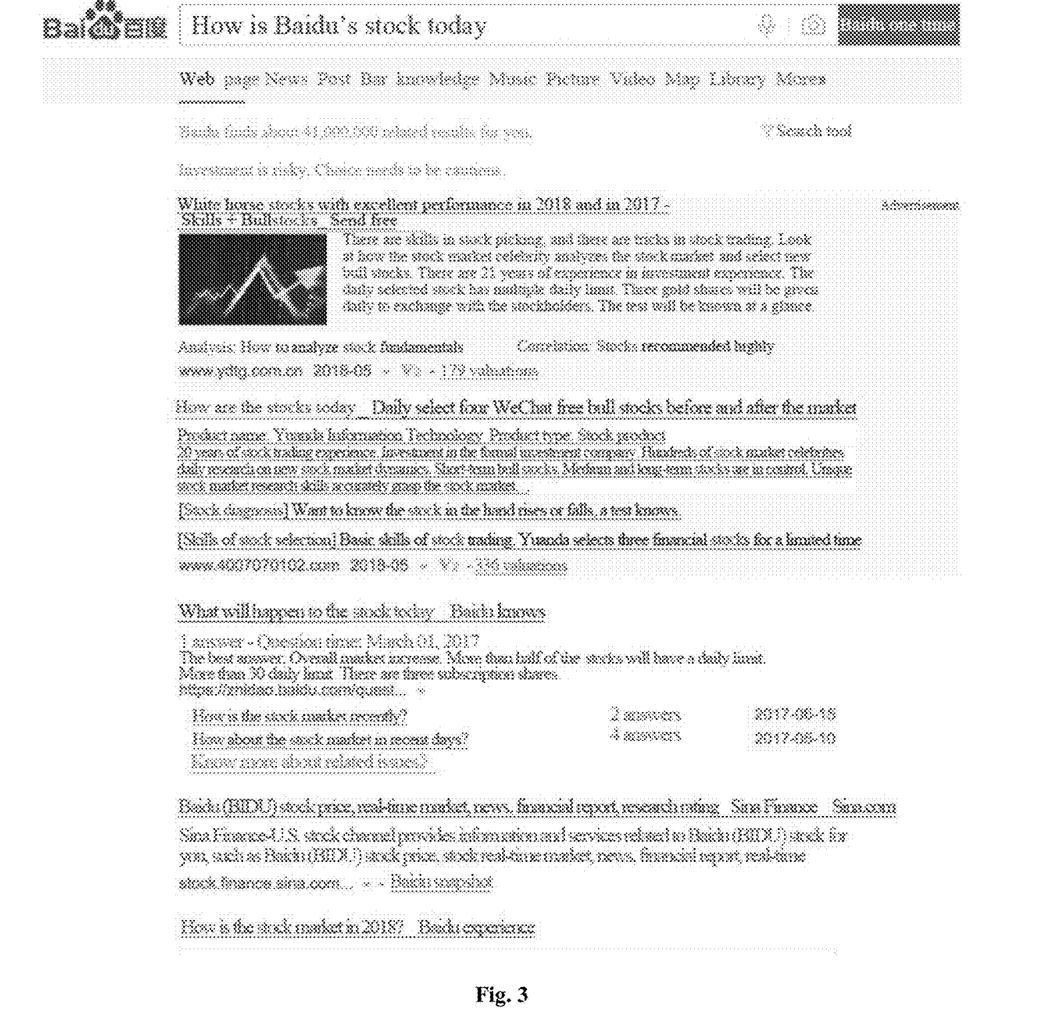
FIG. 3 is a schematic diagram illustrating search results according to an embodiment of the present disclosure.

FIG. 3 is a schematic diagram illustrating search results according to an embodiment of the present disclosure. As illustrated in FIG. 3, by inputting the user input data "how is Baidu's stock today", a plurality of search results may be obtained after retrieving. When the user input data "how is Baidu's stock today" is received, the search engine may search for webpages associated with the question "how is Baidu's stock today".

By using the search engine to obtain the webpage, a scale of a knowledge reserve of the system may be increased greatly, and the update is timely, such that the webpage for the user input data is obtained from an amount of data and is also changed in real time.

The used search engine during the retrieving of the present disclosure may be any existed search engine. For example, when the searching is based on Chinese, the search engine of Baidu may be employed, and when the searching is based on English, the Bing search engine of Microsoft may be employed. The above example is merely for describing but not limiting the search engine.

After the search results associated with the user input data 104 are obtained by the search engine, at block 204, correlation degrees between the search results 108 and the user input data 104 are determined. There are a number of search results 108 associated with the user input data 104. Therefore, in order to provide the search results more precisely, the correlation degree between the search result in the search results 108 and the user input data 104 needs to be determined firstly.

In some embodiments, a retrieving algorithm is employed to determine the correlation degrees and a sequence of the correlation degrees associated with the user input data. Alternatively or additionally, for example, an optimum webpage list of the Internet search engine of Baidu is employed for determining. In another embodiment, determining the correlation degrees between the search results and the user input data includes: determining a keyword in the user input data firstly, then determining the correlation degrees between the search results and the user input data based on historical browsing behavior information associated with the keyword.

After the search results and the correlation degrees are determined, at block 206, candidate content 114 for the user input data 104 is built based on the search results and the correlation degrees. The candidate content 114 includes the paragraph 116 associated with the user input data 104 in the search results. A process for building the candidate content 114 of the user input data 104 will be described in detail below with reference to FIG. 4.

After the candidate content 114 is determined, at block 208, the response 112 for the user input data 104 is determined from the candidate content 114. A process for determining the response for the user input data from the candidate content will be described in detail below with reference to FIG. 6.

After the response 112 for the user input data 104 is determined, the response is returned to the user 102. In some embodiments, the determined response 102 is returned to the user 102 in at least one form of speech, text and table. In another embodiment, the determined response 112 may be returned to the user 102 in any suitable way.

A predetermined number of search results 108 associated with the user input data 104 are determined based on the user input data 104 of the user 102. Candidate content 114 having a higher correlation degree with the user input data 104 is selected from the search results 108. Then the response 112 for the user input data 104 is generated. In this way, a more accurate result may be obtained from a large amount of data, and may be changed with the search results. The obtained response for the user input data may also be updated dynamically. For example, the obtained response may be consistent with the changes in the webpage, and may generate the more accurate response, rather than merely returning some related information.

An overall process for determining the response 112 for the user input data 104 is described in the above FIG. 3. A process for building the candidate content 114 for the user input data 104 in the whole process will be described in detail below with reference to FIG. 4.

Figure 4:
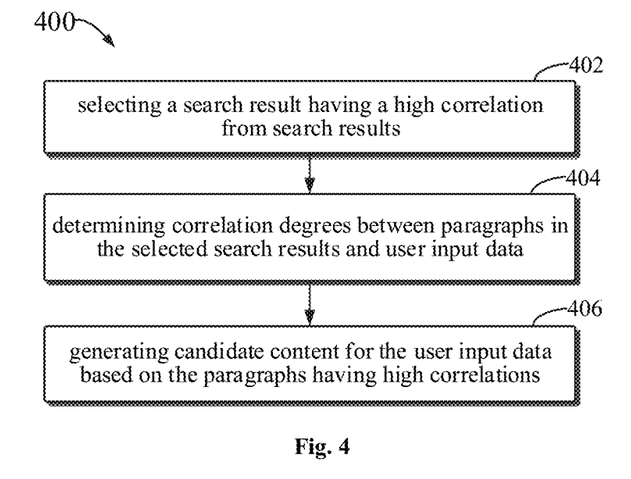
FIG. 4 is a flow chart 400 illustrating a method for building candidate content according to an embodiment of the present disclosure.

After the search results 108 are determined and the correlation degrees between the search results 108 and the user input data 104 are determined, at block 402, a search result having the high correlation degree is selected from the search results 108.

A predetermined number of search results having higher correlation degrees are selected from the search results 108. In some embodiments, the predetermined number of search results may be 100 pieces of search results. In another embodiment, the predetermined number of search results may be any number of search results as needed.

In some embodiments, the correlation degrees between the user input data and the search results may be sorted in a descending order. In this way, the search result having a higher correlation degree is sorted in the front, and the search result having a lower correlation degree is sorted in the behind. Therefore, only the preset number of search results sorted in the front may be selected.

After the search results having higher correlation degrees are selected, at block 404, correlation degrees between paragraphs in the predetermined number of selected search results and the user input data 104 are determined.

After the predetermined number of search results having higher correlation degrees are determined, it means that content in the search results contains content related to the response 112 for the user input data 104. For determining more accurate response information, the paragraphs in the selected search results are firstly obtained, then a correlation degree between each paragraph in the search results and the user input data is calculated. In some embodiments, a predetermined number of webpages having higher correlation degrees with the user input data 104 are selected. For example, 100 pieces of webpages are selected. A correlation degree between each paragraph in the predetermined number of webpages and the user input data 104 is determined. A method for calculating the correlation degree between each paragraph and the user input data 104 will be described in detail below with reference to FIG. 5.

After the correlation degree between each paragraph in the search result and the user input data 104 are determined, at block 406, the candidate content for the user input data is generated based on the paragraphs having higher correlation degrees.

In some embodiments, after the correlation degree between each paragraph in the search results and the user input data are determined, the paragraphs 116 having a high correlation degree is selected to form the candidate content. The candidate content includes paragraphs associated with the user input data in the search results. The candidate content may include one or more paragraphs. In some embodiments, the selected candidate contents are stitched in a descending order of the correlation degrees between the paragraphs 116 and the user input data 104 into a new paragraph. The above-described way is merely an example but not a limitation for the present disclosure. The selected paragraphs 116 may be combined in any suitable way.

Alternatively or additionally, a paragraph is selected from each search result.

For example, after a predetermined number of webpages related to the question "how is Baidu's stock today" are retrieved, a correlation degree between each paragraph in the webpage and the user input data is determined. Then a predetermined number of paragraphs having high correlation degrees with the user input data are selected from the paragraphs to form the candidate content.

A part of search results in the search results 108 are used to be the search results having high correlation degrees with the user input data. Then the paragraphs 116 are selected according to the correlation degrees between the paragraphs in the part of search results and the user input data. Finally, the candidate content 114 is formed. In this way, the number of search results related to the response may be reduced greatly, the processing efficiency is improved and the time is saved. Further, unrelated content in search results related to the response may be removed, and the most relevant content only is saved to form the accurate response.

The process for determining the candidate content 114 is described above with reference to FIG. 4. A process for determining the correlation degrees between the paragraphs in the selected search results and the user input data during the process described in FIG. 4 will be described in detail below with reference to FIG. 5.

Figure 5:
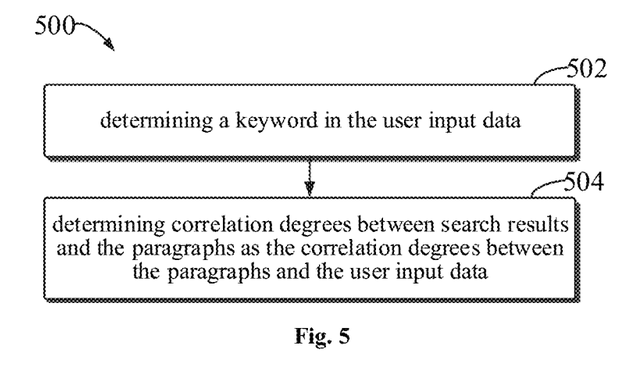
FIG. 5 is a flow chart 500 illustrating a method for determining correlation degrees between content and the user input data according to an embodiment of the present disclosure.

When the correlation degrees between the paragraphs in the search results 108 and the user input data 104 are determined, at block 502, a keyword in the user input data 104 is determined firstly. Any suitable method for determining the keyword based on the user input data 104 in the related art may be used.

After the keyword in the user input data is determined, at block 504, the correlation degrees between the search results and the user input data 104 are determined based on historical browsing behavior information associated with the keyword.

After the keyword is determined, correlation degrees between each keyword and paragraphs are determined. In some embodiments, the correlation degrees between the keyword and the paragraphs are determined by a correlation calculation model. The correlation calculation model may be obtained by using a machine learning algorithm based on training data. The training data include such as a Chinese corpus DuReader and an English corpus MSMARCO. The common features of the two corporas are lie in that: massive user input data of the user and corresponding returned articles (webpages) are collected respectively under Baidu search engine environment and Bing search engine environment; simultaneously, an amount of professional labeling manpower is hired to select one or more text paragraphs from certain paragraphs of these articles (webpages) as an accurate answer of the user input data. Since an amount of user selected paragraphs corresponding to the keyword in the user input data are marked in the corpus, the correlation degrees between respective keywords for the user input data and the paragraphs may be determined. In the model, paragraph weights corresponding to each keyword may also be determined based on a weight of each keyword in all the keywords. Then correlation degrees of paragraphs corresponding to different keyword combinations may be determined based on correlation degrees between the weights and paragraphs. In this way, the correlation degree between each paragraph and the user input data may be determined. In some embodiments, the weight of the keyword is determined based on a ratio of the number of occurrences of the keyword to the number of occurrences of all keywords.

The correlation degrees between the paragraphs and the user input data are determined by using the correlation degrees between the keyword in the user input data and the paragraphs, which may improve the accurate of the correlation degrees between the user input data and the paragraphs, and may determine the correlation degrees more quickly.

The process for determining the correlation degrees between the paragraphs 116 and the user input data 104 is described by FIG. 5. A process for determining the response 112 for the user input data from the candidate content 114 will be described in detail below with reference to FIG. 6.

Figure 6:
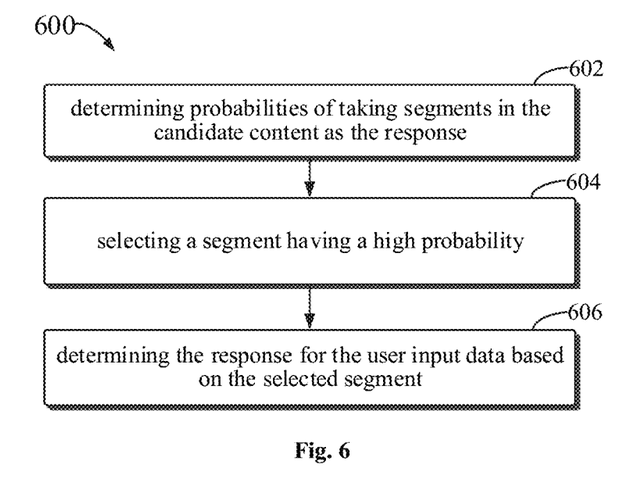
FIG. 6 is a schematic diagram 600 illustrating a method for determining a response for user input data according to an embodiment of the present disclosure.

After the candidate content 114 is determined, at block 602, probabilities of taking segments in the candidate content 114 as the response 112 are determined. In some embodiments, the segment may be a sequent fragment, such as a sequent text fragment. It should be understood that, in embodiments of the present disclosure, the segment may be represented in various forms, and the sequent text segment is merely taken for an explaining purpose, which does not aim to limit the scope of the present disclosure.

Since the candidate content 114 has a higher correlation degree with the user input data 104, information for the response may be determined from the candidate content 114. When determining the information used as the response 112, the probabilities of taking segments in the candidate content as the response need to be determined.

In some embodiments, determining the probabilities of taking the segments in the candidate content as the response may be implemented by a machine reading comprehension model. The machine reading comprehension model is obtained by a machine learning algorithm training the training data. The training data includes: Chinese corpus WebQA and English corpus SQUAD. The common features of the two corporas lie in that: when some encyclopedia articles are given, related user input data is provided for these articles, and language labeling may be performed on the content to form the response; these user input data, corresponding responses and text of the response resource are collected. When the machine reading comprehension model is trained, for the user input data, content refining and language improvement may be performed on the original segment in the text to obtain the response. In the model, an amount of data is trained for different questions. Therefore, the probability of determining each word inputted by the user as the response may be determined in the model. For example, the probability of words in each article obtained for the user input data as the response may be obtained. Therefore, the probabilities of respective words being taken as the response for the user input data may be determined by massive data. Therefore, when the user input data 104 and the obtained candidate content 114 are inputted into the model, the probability of taking each word as the answer is determined. At the same time, the probability of the segment may be calculated based on the number of words contained in the segment set by the user. In some embodiments, the probability of the segment is determined by multiplying the probabilities of respective words. Alternatively or additionally, the segment should be a sequential text segment. Therefore, the calculated probability is the probability of the sequential text segment.

At block 604, a segment having a higher probability is selected. In some embodiments, after the probabilities of the segments are determined in the above reading comprehension model, the segment having a high probability is selected. The number of the selected segments with high probabilities may be set based on user's need. Therefore, the above model gives the most concise and accurate fragment in the candidate content according to the user input data.

At block 606, the response for the user input data is determined based on the selected segment. After the segment for the response is determined, the selected segment and the user input data are applied to a response generation model, to generate the response 112. The response generation model is determined based on training the user input data and the segments.

In some embodiments, the response generation model is obtained by training the user input data and the segments obtained from the above machine reading comprehension model. For the user input data and the obtained segments, the changed content in the obtained segments may be removed, and the unchanged content is remained to form the response generation model. By using the response generation model, the most accurate response for the user input data is obtained in combination with the plurality of selected segments.

In some embodiments, when applying the obtained segments to the response generation model, the obtained segments are put into the model to form the response 112 based on types of segments. Alternatively or additionally, when applying the plurality of segments to the model, the data types for respective positions in the response generation model are determined in advance.

By determining the segments based on the probabilities associated with the response, a more accurate segment for the response may be selected from the candidate content, thus ensuring the accuracy of the given response. By using a template of the response for other user input data, humanization of the response is realized.

Figure 7:
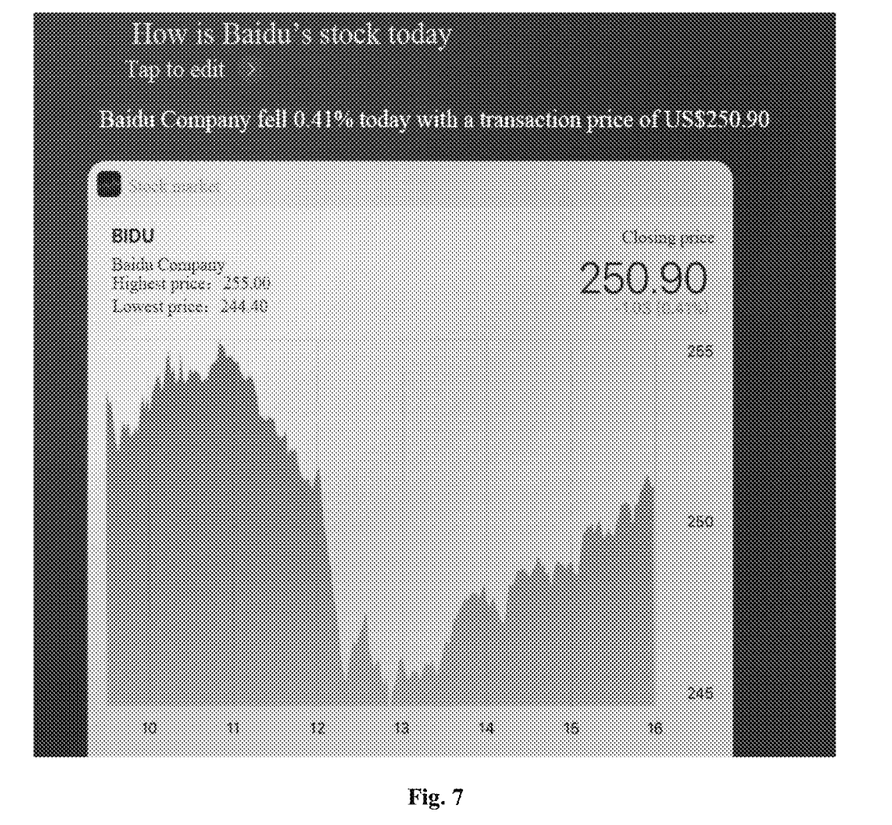
FIG. 7 is a schematic diagram of determining a response according to an embodiment of the present disclosure.

FIG. 7 is a schematic diagram of determining a response according to an embodiment of the present disclosure. The example of FIG. 7 illustrates a response for the user input data "how is Baidu's stock today". The response includes a share-price drops and a transaction price of Baidu Company, and also shows a price picture corresponding to the stock. In this way, an accurate response is provided for the question of the user by using brief combined information. The response may also be shown in a way of an audio, a text, or a table for the user. The above example is merely an explanation but not a limitation of the present disclosure. Any suitable way may be employed to provide the response for the user in the present disclosure.

Figure 8:
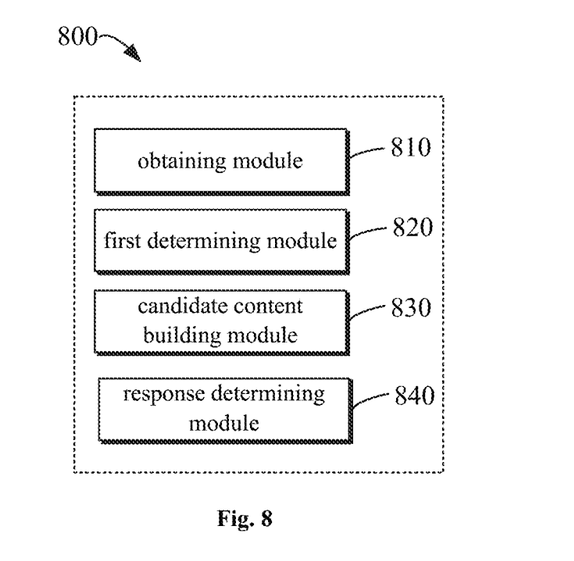
FIG. 8 is a block diagram 800 illustrating an apparatus for determining a response for user input data according to an embodiment of the present disclosure.

FIG. 8 is a block diagram 800 illustrating an apparatus for determining a response for user input data according to an embodiment of the present disclosure. As illustrated in FIG. 8, the apparatus 800 may include an obtaining module 810, configured to obtain search results associated with the user input data. The apparatus 800 may further include a first determining module 820, configured to determine correlation degrees between the search results and the user input data. The apparatus 800 may further include a candidate content building module 830, configured to build candidate content for the user input data based on the search results and the correlation degrees. The candidate content includes a paragraph associated with the user input data in the search results. The apparatus 800 may further include a response determining module 840, configured to determine the response for the user input data from the candidate content.

In some embodiments, the first determining module 820 includes: a first keyword determining module and a second determining module. The first keyword determining module is configured to determine a keyword in the user input data. The second determining module is configured to determine the correlation degrees between the search results and the user input data based on historical browsing behavior information associated with the keyword.

In some embodiments, the candidate content building module 830 includes: a first selecting module, a third determining module and a candidate content generation module. The first selecting module is configured to select a predetermined number of search results from the search results according to the correlation degrees between the search results and the user input data. The third determining module is configured to determine correlation degrees between paragraphs in the predetermined number of search results selected and the user input data. The candidate content generation module is configured to generate the candidate content for the user input data based on at least one paragraph selected from the paragraphs according to the correlation degrees between the paragraphs in the predetermined number of search results selected and the user input data.

In some embodiments, the third determining module includes: a second keyword determining module and a fourth determining module. The second keyword determining module is configured to determine a keyword in the user input data. The fourth determining module is configured to determine correlation degrees between the paragraphs and the keyword as the correlation degrees between the paragraphs in the predetermined number of search results selected and the user input data.

In some embodiments, the response determining module 840 includes: a probability determining module, a second selecting module and a fifth determining module. The probability determining module is configured to determine probabilities of taking segments in the candidate content as the response. The second selecting module is configured to select a segment according to the probabilities. The fifth determining module is configured to determine the response for the user input data based on the segment selected.

In some embodiments, the fifth determining module includes a response generating module, configured to apply the segment selected and the user input data to a response generation mode, to generate the response. The response generation mode is determined based on training the user input data and training the segments.

In some embodiments, the apparatus for determining a response for user input data further includes a return module, configured to provide the response to a user in at least one form of: speech, text and table.

Figure 9:
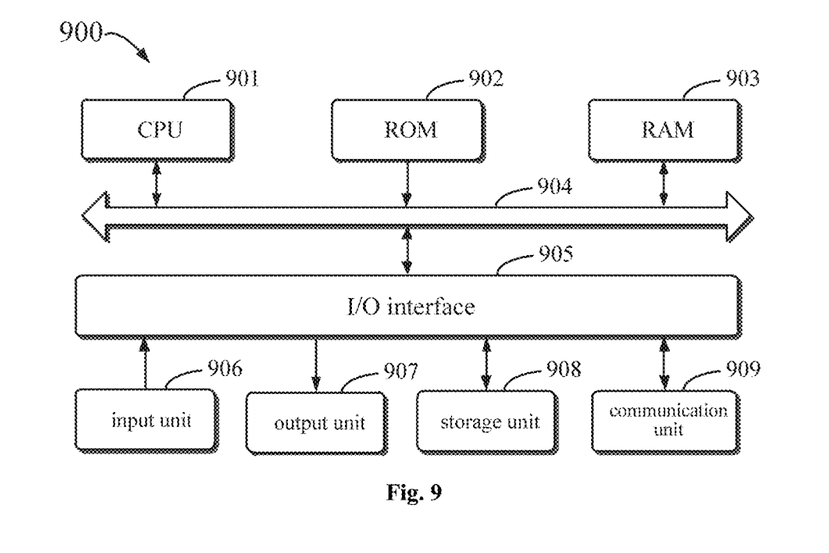
FIG. 9 is a block diagram 900 illustrating an electronic device capable of implementing a plurality of embodiments of the present disclosure.

FIG. 9 is a block diagram 900 illustrating an electronic device capable of implementing a plurality of embodiments of the present disclosure. It should be understood that, the device 900 may be configured to implement the apparatus 900 for determining a response for user input data according to the present disclosure described in the present disclosure. As illustrated in FIG. 9, the device 900 includes a Central Processing Unit (CPU) 901, which may execute various appropriate acts and processing based on computer program instructions stored in a read-only memory (ROM) 902 or computer program instructions loaded from a storage unit 908 to a random-access memory (RAM) 903. In the RAM 903, various programs and data needed for the operation of the device 900 may be stored. The CPU 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, such as a keyboard, a mouse, etc.; an output unit 907, such as various types of displays, speakers, etc.; the storage unit 908, such as a disk, a CD, etc.; and a communication unit 909, such as a network card, a modem, a wireless communication transceiver, etc. The communication unit 909 allows the device 900 to exchange information/data with other devices via computer networks such as the Internet and/or various telecommunications networks.

The processing unit 901 executes the various methods and procedures described above, such as the methods 200, 400, 500 and 600. For example, in some embodiments, the methods 200, 400, 500 and 600 may be implemented as computer software programs, which are physically contained in a machine-readable medium, such as the storage unit 908. In some embodiments, some or all of the computer programs may be loaded and/or installed on the device 900 via the ROM 902 and/or the communication unit 909. The computer programs may execute one or more acts or steps of the methods 200, 400, 500 and 600 described above when loaded to the RAM 903 and executed by the CPU 901. Alternatively, in other embodiments, the CPU 901 may be configured to execute the method 200 and/or the method 400 by any other appropriate ways (such as, by means of a firmware).

The above functions described herein may be executed at least partially by one or more hardware logic components. For example, without limitation, exemplary types of hardware logic components, including a field-programmable gate array (FPGA), an application-specific integrated circuit (ASIC), an application specific standard product (ASSP), a system on chip (SOC), a load programmable logic device (CPLD) and so on, may be used.

The program codes for implementing the method of embodiments of the present disclosure may be written in any combination of one or more program languages. These program codes may be provided for a processor or a controller of a general-purpose computer, a special-purpose computer, or other programmable data-processing devices, such that the functions/operations regulated in the flow charts and/or block charts are implemented when the program codes are executed by the processor or the controller. The program codes may be completely executed on the machine, partly executed on the machine, partly executed on the machine as a standalone package and partly executed on a remote machine or completely executed on a remote machine or a server.

In the context of the present disclosure, the machine readable medium may be a tangible medium, which may include or store the programs for use of an instruction execution system, apparatus or device or for use in conjunction with the instruction execution system, apparatus or device. The machine readable medium may be a machine readable signal medium or a machine readable storage medium. The machine readable medium may include but not limited to electronic, magnetic, optical, electromagnetic, infrared, or semiconductor systems, apparatuses or devices, or any appropriate combination of the foregoing contents. A more detailed example of the machine readable storage medium includes electrical connections based on one or more lines, a portable computer disk, a hard disk, a random access memory (RAM), a read-only memory (ROM), an erasable programmable read only memory (an EPROM or a flash memory), an optical fiber, a compact disc read-only memory (CD-ROM), an optical storage device, a magnetic storage device, or any appropriate combination of the above contents.

In addition, although respective act or step is described in a particular sequence, it should be understood that such act or step are required to be executed in the specified or sequential order as illustrated, or all illustrated acts or steps are required to be executed to achieve a desired result. Under certain environment, multitasking and parallel processing may be beneficial. In the same way, although several specific implementation details are included in the above discussion, these should not be interpreted as limitations of the scope of the present disclosure. Certain features described in the context of a single embodiment may also be in a combination manner to be implemented in a single implementation. On the contrary, the various features described in the context of a single implementation may also be implemented in multiple implementations individually or in any appropriate sub-combination.

Although language specific to structural features and/or method logic actions has been employed to describe the embodiments of the present disclosure, it should be understood that the subject matter defined in the appended claims is not necessarily limited to the specific features or acts described above. On the contrary, the specific features or acts described above are merely an exemplary form for implementing the claims.

What is claimed is:

1. A method for determining a response for user input data, performed by an intelligent question answering device, comprising:

obtaining search results associated with the user input data by using a search engine through a network;

determining correlation degrees between the search results and the user input data based on a keyword in the user input data;

building candidate content for the user input data based on the search results and the correlation degrees, comprising: selecting a predetermined number of search results from the search results according to the correlation degrees between the search results and the user input data; determining correlation degrees between paragraphs in the predetermined number of search results selected and the user input data; and generating the candidate content for the user input data based on at least one paragraph selected from the paragraphs according to the correlation degrees between the paragraphs in the predetermined number of search results selected and the user input data; and determining the response for the user input data from segments of the candidate content based on probabilities of the user input data in the segments, comprising: selecting a segment in a descending order of possibilities, and determining the response for the user input data based on the segment selected.

2. The method of claim 1, wherein, determining the correlation degrees between the search results and the user input data comprises:

determining the correlation degrees between the search results and the user input data based on historical browsing behavior information associated with the keyword.

3. The method of claim 1, wherein selecting the predetermined number of search results from the search results according to the correlation degrees between the search results and the user input data comprises:

selecting the predetermined number of search results from the search results in a descending order of the correlation degrees between the search results and the user input data.

4. The method of claim 1, wherein the at least one paragraph is selected from the paragraphs in the predetermined number of search results in a descending order of the correlation degrees between the paragraphs in the predetermined number of search results selected and the user input data.

5. The method of claim 1, wherein, determining the correlation degrees between the paragraphs in the predetermined number of search results selected and the user input data comprises:

determining correlation degrees between the paragraphs and the keyword as the correlation degrees between the paragraphs in the predetermined number of search results selected and the user input data.

6. The method of claim 1, wherein, determining the response for the user input data based on the segment selected comprises:

applying the segment selected and the user input data to a response generation model, to generate the response, in which, the response generation mode is determined based on training the user input data and training the segments.

7. The method of claim 1, further comprising:

providing the response to a user in at least one form of: speech, text and table.

8. An apparatus for determining a response for user input data, applied to an intelligent question answering device, comprising:

one or more processors and a memory; wherein the one or more processors are configured to:

obtain search results associated with the user input data by using a search engine through a network;

determine correlation degrees between the search results and the user input data based on a keyword in the user input data;

build candidate content for the user input data based on the search results and the correlation degrees by performing acts of: selecting a predetermined number of search results from the search results according to the correlation degrees between the search results and the user input data; determining correlation degrees between paragraphs in the predetermined number of search results selected and the user input data; and generating the candidate content for the user input data based on at least one paragraph selected from the paragraphs according to the correlation degrees between the paragraphs in the predetermined number of search results selected and the user input data; and determine the response for the user input data from segments of the candidate content based on probabilities of the user input data in the segments, comprising: selecting a segment in a descending order of possibilities, and determining the response for the user input data based on the segment selected.

9. The apparatus of claim 8, wherein, the one or more processors determine the correlation degrees between the search results and the user input data by performing an act of:

determining the correlation degrees between the search results and the user input data based on historical browsing behavior information associated with the keyword.

10. The apparatus of claim 8, wherein, the one or more processors select the predetermined number of search results from the search results according to the correlation degrees between the search results and the user input data by performing an act of: selecting the predetermined number of search results from the search results in a descending order of the correlation degrees between the search results and the user input data; and the at least one paragraph is selected from the paragraphs in the predetermined number of search results in a descending order of the correlation degrees between the paragraphs in the predetermined number of search results selected and the user input data.

11. The apparatus of claim 8, wherein, the one or more processors determine the correlation degrees between the paragraphs in the predetermined number of search results selected and the user input data by performing an act of:

determining correlation degrees between the paragraphs and the keyword as the correlation degrees between the paragraphs in the predetermined number of search results selected and the user input data.

12. The apparatus of claim 8, wherein, the one or more processors determine the response for the user input data based on the segment selected by performing an act of:

applying the segment selected and the user input data to a response generation mode, to generate the response, in which, the response generation mode is determined based on training the user input data and training the segments.

13. The apparatus of claim 8, wherein the one or more processors are further configured to:

provide the response to a user in at least one form of: speech, text and table.

14. A non-transitory computer readable storage medium having a computer program stored thereon, wherein, when the computer program is executed by a processor, the processor is caused to perform a method for determining a response for user input data, wherein the method is performed by an intelligent question answering device and comprises:

obtaining search results associated with the user input data by using a search engine through a network;

determining correlation degrees between the search results and the user input data based on a keyword in the user input data;

building candidate content for the user input data based on the search results and the correlation degrees, comprising: selecting a predetermined number of search results from the search results according to the correlation degrees between the search results and the user input data; determining correlation degrees between paragraphs in the predetermined number of search results selected and the user input data; and generating the candidate content for the user input data based on at least one paragraph selected from the paragraphs according to the correlation degrees between the paragraphs in the predetermined number of search results selected and the user input data; and determining the response for the user input data from segments of the candidate content based on probabilities of the user input data in the segments, comprising: selecting a segment in a descending order of possibilities, and determining the response for the user input data based on the segment selected.

* * * * *